Inventors
COLIN GILLATT BRITTEN
PATRICK JOHN ASHMOLE
By Cushman, Darby & Cushman
Attorneys

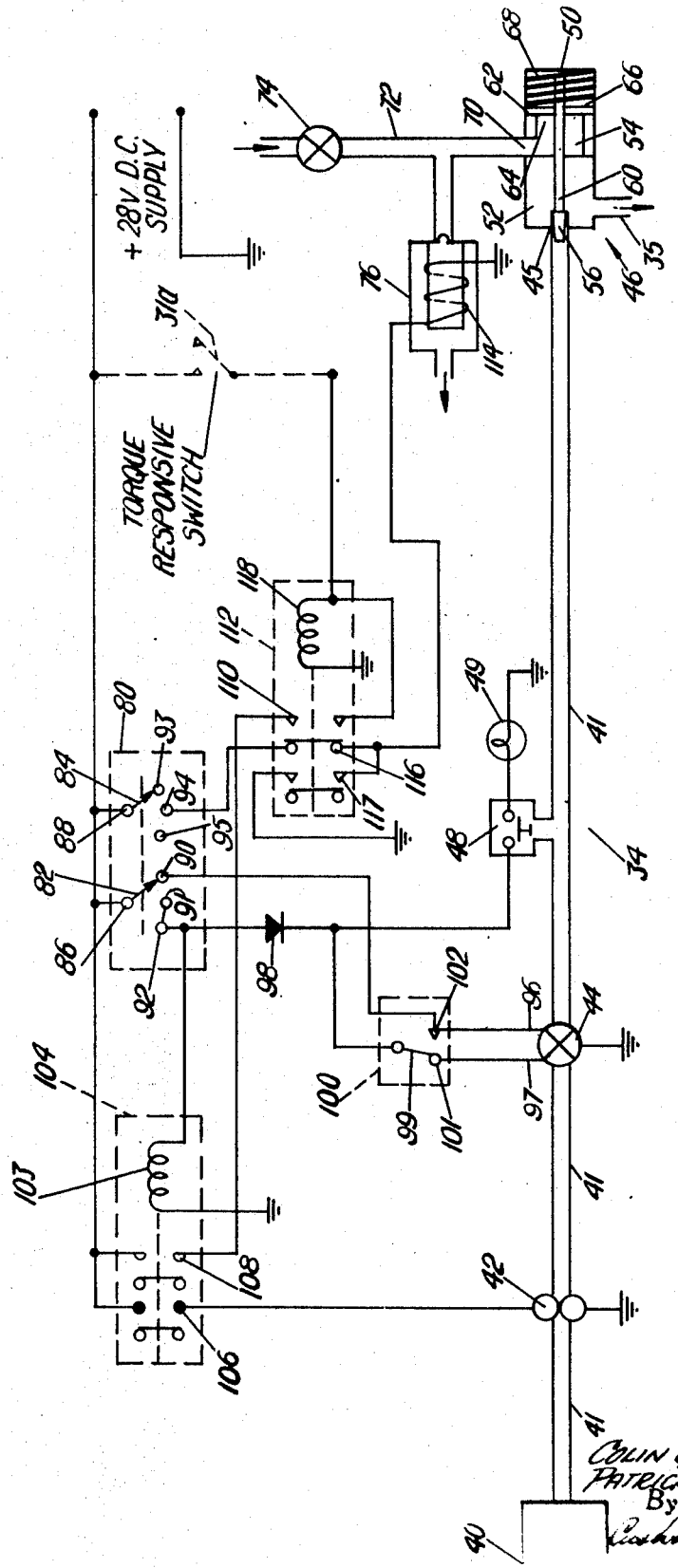

_United States Patent Office_  3,518,023
Patented June 30, 1970

3,518,023
STANDBY CONTROL SYSTEM FOR MULTI-ENGINE POWER PLANTS
Colin G. Britten, Linby, England, and Patrick John Ashmole, Strathaven, Scotland, assignors to Rolls-Royce Limited, Derby, England, a British company
Filed June 17, 1968, Ser. No. 737,439
Claims priority, application Great Britain, July 1, 1967, 30,457/67
Int. Cl. F02c 7/02; F02g 3/00
U.S. Cl. 416—30         6 Claims

ABSTRACT OF THE DISCLOSURE

The invention relates to a stand-by water/methanol injection system for an aircraft having at least two gas turbine engines, wherein the injection of water/methanol in each engine is controlled by a hydraulically operated valve the supply of hydraulic fluid to which is controlled by a further valve in response to a signal indicative of engine failure, whereby should one engine fail for example during take-off, the injection of water/methanol is automatically initiated on the other engine.

---

Figure 1:
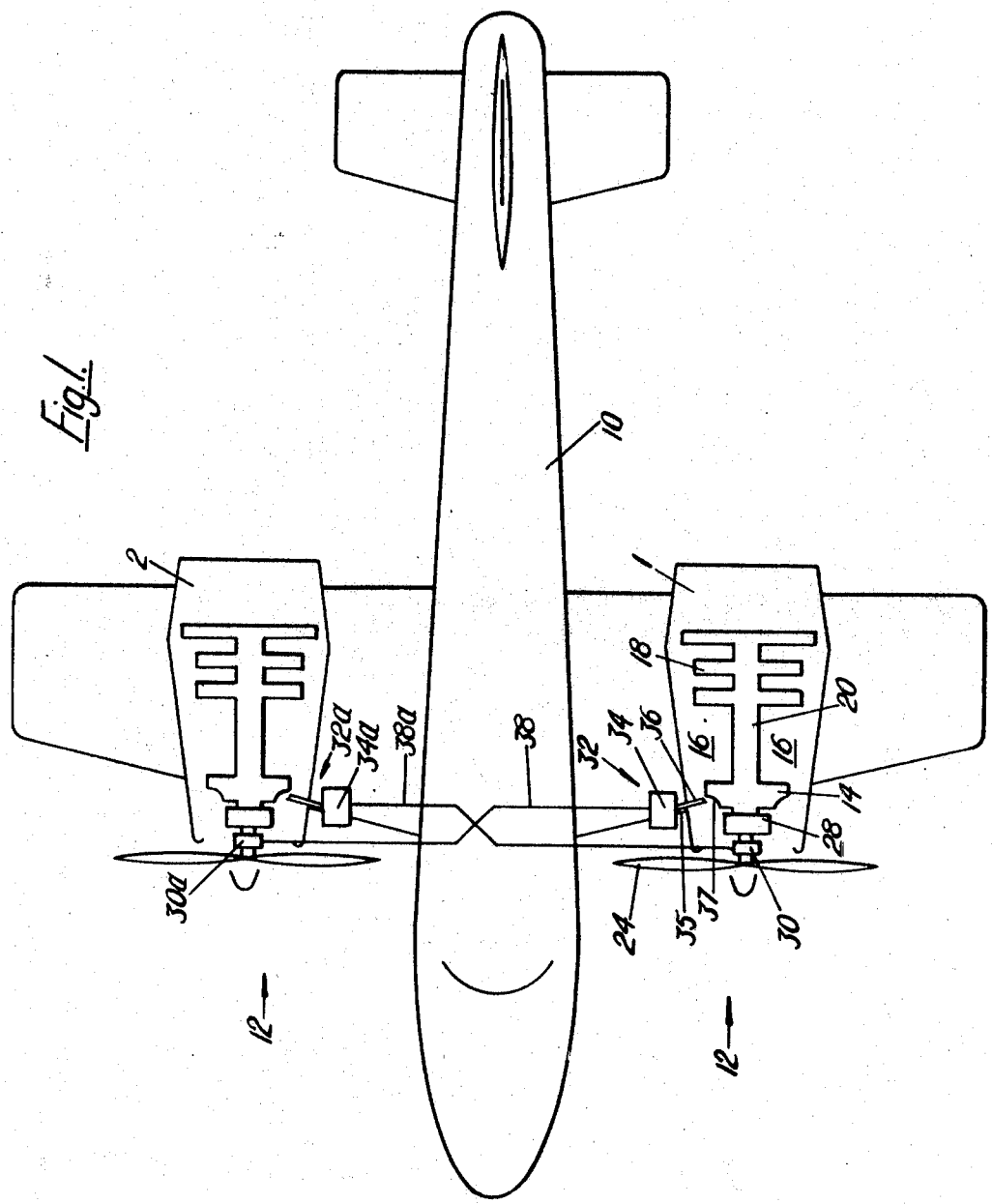

This invention relates to aircraft power plants.

According to the present invention, a power plant for an aircraft comprises at least two gas turbine engines each having injection means whereby a power-augmenting fluid may be injected into the gas flow through the engine, normally closed fluid pressure operable valve means adapted to control the flow of power-augmenting fluid to the injection means, further control valve means adapted to control the supply of pressure fluid to said fluid pressure operable valve means and a torque responsive device responsive to the torque produced by a shaft of the engine, the arrangement being such that, should one engine fail during operation of the power plant, a signal from the torque responsive device on that engine causes the further control valve means on the other engine to operate so as to open the fluid pressure operable valve means on said other engine.

Preferably, each further control valve means comprises a conduit connected to supply pressure fluid to said fluid pressure operable valve means and a bleed which is adapted to bleed pressure fluid from the conduit and which is adapted to close in response to the signal from the torque responsive device.

Each bleed valve may comprise a solenoid operated valve, the solenoid of which is adapted to be de-energised in response to the signal from the torque responsive device.

Preferably, there is provided self-holding switching means which is connected to receive the signal from the torque responsive device and adapted to de-energise the solenoid of the solenoid operated valve.

Each conduit is preferably provided with speed responsive valve means upstream of the bleed valve, the speed responsive valve means being adapted to open when the rotational speed of a shaft of the engine exceeds a predetermined value.

In a preferred embodiment of the invention, each gas turbine engine is a turbo-propeller gas turbine engine the propeller of which is provided with an auto-feathering mechanism, the torque responsive device being adapted to form part of the auto-feathering mechanism.

The fluid pressure operable valve means is preferably hydraulically operable.

The power-augmenting fluid is preferably coolant/fuel mixture, for example a water/methanol mixture.

The invention will now be particularly described, by way of example only, with reference to the accompanying drawings, in which:

FIG. 1 is a diagrammatic representation of an aircraft provided with a power plant in accordance with the invention; and FIG. 2 is a schematic diagram of part of the power plant of FIG. 1.

In FIG. 1 there is shown an aircraft 10 having a power plant 12 which comprises two turbo propeller gas turbine engines 1 and 2. The engines 1 and 2 are identical, so only engine 1 will be described in detail. However, similar parts on engine 2 will be given the same reference numeral, with the addition of the letter a.

The engine 1 comprises, in flow series, a centrifugal comprissor 14, combustion equipment 16 and a turbine 18 which is drivingly connected to the compressor 14 by shaft 20. The shaft 20 is extended forwardly of the compressor 14 and is drivingly connected to a propeller 24 via a shaft reduction gearing 28 and an auto feathering mechanism 30. The auto feathering mechanism 30 is operative to feather the propeller 24 in the event of failure of the engine 1 and includes a normally open torque responsive switch (one such switch for the other engine being shown at 31a in FIG. 2) which is arranged to close when the torque transmitted to the propeller 24 falls below a predetermined value.

The engine 1 is additionally provided with water/methanol injection equipment 32 which comprises an injection control system 34 having an outlet 35 communicating with an injection nozzle 36. The injection nozzle 36 is directed towards the front surface 37 of the centrifugal compressor 14.

The injection control system 34 of engine 1 is connected to the torque responsive switch 31a (FIG. 2) of the auto feathering mechanism 30a on engine 2 by a cable 38, while the injection control system 34a on engine 2 is connected to the torque responsive switch of auto feathering mechanism 30 on engine 1 by a cable 38a.

The injection control system 34 is shown in more detail in FIG. 2, and can be seen to comprise a tank 40, adapted to contain a water/methanol mixture, connected to an inlet 45 of an hydraulically operated metering valve 46 by a conduit 41 containing, in flow series, an electrically driven pump 42 and an electrically operated shut off cock 44. A pressure operated switch 48, which is operatively connected to an indicator lamp 49, is provided in conduit 41 immediately downstream of the shut off cock 44.

The metering valve 46 comprises a cylindrical casing 50 divided into two axially spaced chambers 52 and 54. The chamber 52 communicates with the inlet 45 via a profiled valve member 56 and with the outlet 35 of the injection control system 34.

The profiled valve member 56 is mounted on the end of a piston rod 60 which projects axially of the casing 50, through the chamber 52, into the chamber 54. Mounted on the piston rod 60 within the chamber 54 is a piston 62, one side 64 of which is exposed to hydraulic fluid and the other side 66 of which is acted upon by a spring 68. The chamber 54 has an inlet 70 connected via a conduit 72 to a speed responsive valve 74. The conduit 72 also communicates with a solenoid actuated bleed valve 76, while the speed responsive valve 74 communicates with a source of hydraulic fluid (not shown).

The injection control system 34 is provided with a 3-position, two pole selector switch 80 having wipers 82, 84 which selectively connect contacts 86, 88 respectively with contacts 90, 91, 92 and 93, 94, 95 respectively. Contacts 86 and 88 are connected to the positive terminal of a 28 volt DC supply (not shown).

Contact 90 is connected to one input 96 (a "close" input) of the electrically operated shut off cock 44, while contacts 91 and 92 are connected via blocking diode 98 to a wiper 99 of a microswitch 100 and to the pressure responsive switch 48.

A normally closed contact 101 and a normally open contact 102 of the microswitch 100 are connected to another input 97 (an "open" input) and to the input 96 respectively of the electrically operated shut off cock 44. In the event of an engine fire, movement of emergency lever (not shown) operates the microswitch 100, thus closing the shut off cock 44.

Contacts 91 and 92 are also connected to a coil 103 of a contactor 104, a pair of normally open contacts 106 of which are connected between the electrically driven pump 42 and the DC supply. A second pair of normally open contacts 108 of the contactor 104 are connected between the positive terminal of the DC supply and a pair of normally open contacts 110 of a contacter 112.

Contact 94 of selector switch 80 is connected to energising coil 114 of the solenoid actuated bleed valve 76 via a pair of normally closed contacts 116 of the contactor 112. The energising coil 114 of the solenoid actuated bleed valve 76 is also connected, via pair of normally open contacts 117 of the contacts 112, to the negative terminal of the DC supply.

The normally open contacts 110 of the contactor 112 are connected to coil 118 of the contactor 112, which coil is connected to the torque responsive switch 31a of the auto feathering mechanism 30a of engine 2.

In operation, the power plant 12 may be operated with selector switch 80 in one of three positions, which will be referred to as "OFF" "STANDBY" and "ON."

In the "OFF" position (illustrated) of the selector switch 80, the electrically operated shut off cock 44 is held closed via the contact 90 of the selector switch 80 and the input 96 of the shut off cock 44. The flow of water/methanol mixture in the conduit 41 is thus prevented at all times.

In the "ON" position of the selector switch 80, the wipers 82 and 84 are in contact with the contacts 92 and 95 respectively, thereby energising the coil 103 of the contactor 104 and holding the electrically operated shut off cock 44 open via the input 97 thereof. The normally open contacts 106, 108 of the contactor 104 become closed, the former acting to energise the electrically driven pump 42. The water/methanol mixture is thus supplied to the hydraulically operated metering valve 46. Above a predetermined speed of the shaft 20, the speed responsive valve 74 is opened, and hydraulic fluid is suppled to the side 64 of the piston 62 in the chamber 54. The profiled valve member 56 therefore moves in an opening direction and the water/methanol mixture passes to the injection nozzle 36 (FIG. 1), thus augmenting the power produced by the engine 1.

The pressure of the water/methanol mixture in the conduit 41 is monitored by the pressure responsive switch 48 and the indicator lamp 49.

In the "STANDBY" position of the selector switch 80, the contactor 104 and the pump 42 are energised and the shut off cock 44 is held open as in the "ON" position; in addition, however, the energising coil 114 of the solenoid actuated bleed valve 76 is energized via the normally closed contacts 116 of contactor 112, thus opening the bleed valve 76. During normal operation of the power plant 12, therefore, when the speed responsive valve 74 opens, hydraulic fluid is bled from the conduit 72 by the bleed valve 76, and the metering valve 46 remains closed.

However, should engine 2 fail during operation of the power plant 12, the torque responsive switch 31a of auto feathering mechanism 30a closes, thereby energising the coil 118 of the contactor 112. The normally open contacts 110 close, thereby holding the coil 118 energised, while the normally closed contacts 116 and the normally open contacts 117 open and close respectively, thereby de-energising and short circuiting the energising coil 114 of the solenoid actuated bleed valve 76, which closes. Since hydraulic fluid can no longer bleed from the conduit 72, the metering valve 46 operates to initiate water/methanol injection in the normal manner.

Similarly, should engine 1 fail during operation of the power plant 12, the torque responsive switch of auto feathering mechanism 30 causes the injection control system 34a of engine 2 to initiate water/methanol injection into engine 2.

Thus, when the power plant 12 is operated under conditions in which the power developed by one of the engines 1, 2 is insufficient without the injection of the water/methanol for safe operation of the aircraft 10 (i.e. at take-off), the selector switch 80 may be set to the "STANDBY" position. The injection of the water/methanol mixture is then only initiated if necessitated by the failure of one engine, and the costly use of water/methanol injection is therefore minimised.

It will be appreciated that the contactors 104, 112 may be replaced by suitable transistor circuitry by one skilled in the art, while the bleed valve 76 may be replaced either by a pneumatically operated metering valve or by an electrically operated metering valve having suitably modified control circuitry.

We claim:
1. A power plant for an aircraft comprising:
at least two gas turbine engines, each of said engines having injection means for injecting a power augmenting fluid into gas flow through the same; normally closed fluid pressure operable valve means arranged to control flow of power augmenting fluid to its engine; and a torque responsive device for producing a signal when torque produced by a shaft of its engine falls below a predetermined value; each fluid pressure operable valve means having a conduit for supplying pressure fluid to the same; a solenoid operated bleed valve for each conduit and arranged to bleed pressure fluid from the conduit; and self-holding switching means for each of said engines, each of said self-holding switch means receiving the signal from the torque responsive device of the other of said engines, and for closing the solenoid operated bleed valve of its engine in response thereto, whereby, should one engine fail during operation of the power plant, the signal from the torque-responsive device on that engine operatively causes the fluid pressure operable valve means on said other engine to open.

2. A power plant as claimed in claim 1, wherein each conduit is provided with speed responsive valve means upstream of the bleed valve, said speed responsive valve means for one engine being opened when the rotational speed of a shaft of its engine exceeds a predetermined value.

3. A power plant as claimed in claim 1, wherein each gas turbine engine is a turbo-propeller gas turbine engine the propeller of which is provided with an auto feathering mechanism, the torque responsive device forming a part of the auto feathering mechanism.

4. A power plant as claimed in claim 1, wherein the fluid pressure operated valve means is hydraulically operable.

5. A power plant as claimed in claim 1, wherein the power-augmenting fluid is a coolant/fuel mixture, for example a water/methanol mixture.

6. A power plant as claimed in claim 1, wherein each solenoid operated bleed valve includes a solenoid which is de-energized in response to the signal from the torque responsive device of the other engine.

References Cited

UNITED STATES PATENTS

| | | | |
|---|---|---|---|
| 2,595,345 | 5/1952 | Englehardt et al. | 170—135.72 X |
| 2,737,776 | 3/1956 | Strough. | |
| 2,768,504 | 10/1956 | Wente et al. | 60—39.15 |
| 2,795,107 | 6/1957 | Haworth et al. | 60—39.28 |
| 2,912,822 | 11/1959 | Hooker | 60—39.09 |
| 2,942,416 | 6/1960 | Buckingham | 60—97 X |
| 3,049,880 | 8/1962 | Bracey et al. | 60—39.15 |
| 3,434,281 | 3/1969 | Donaldson | 60—39.09 X |

FOREIGN PATENTS

| | | |
|---|---|---|
| 617,729 | 2/1949 | Great Britain. |

A. LAWRENCE SMITH, Primary Examiner

U.S. Cl. X.R.

60—39.15, 39.53, 102; 416—33